Aug. 12, 1941.   C. BARBIERI   2,252,360
CONTAINER AND METHOD OF MAKING SAME
Filed March 9, 1940   5 Sheets-Sheet 1
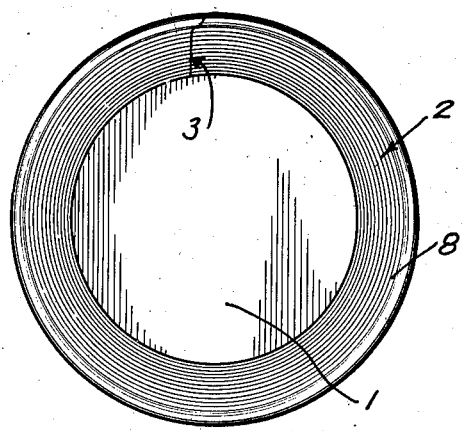
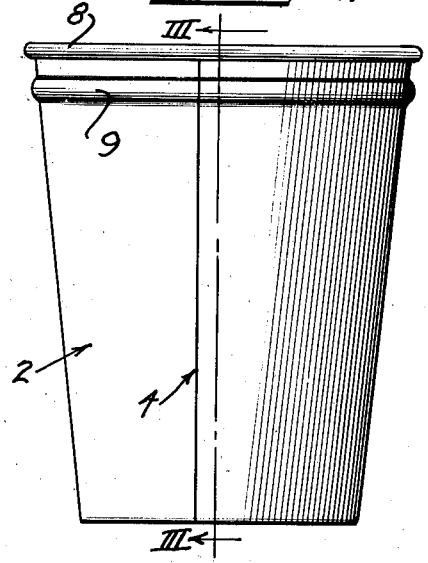
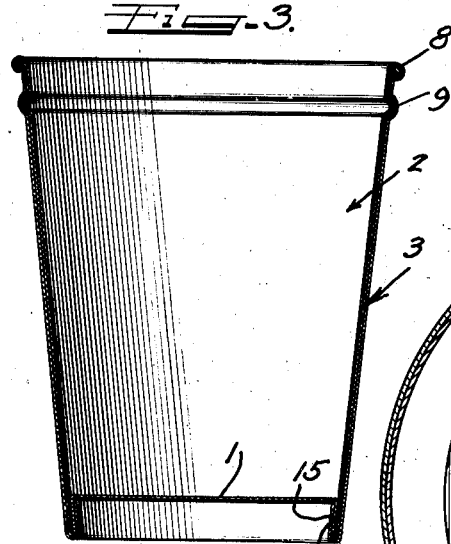
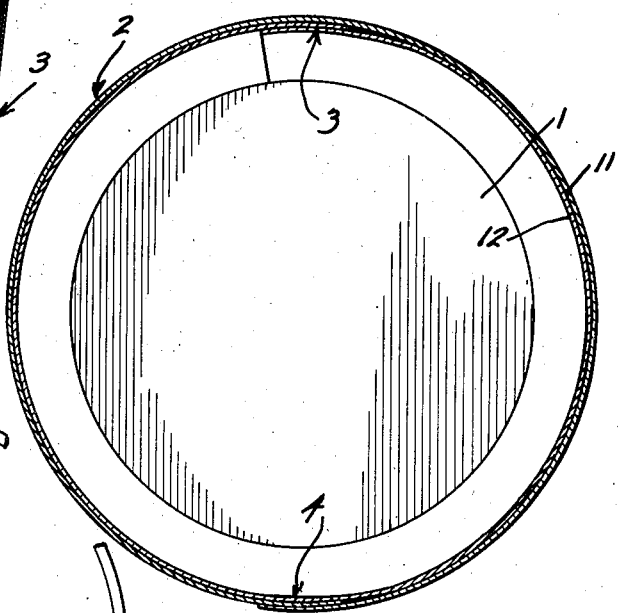
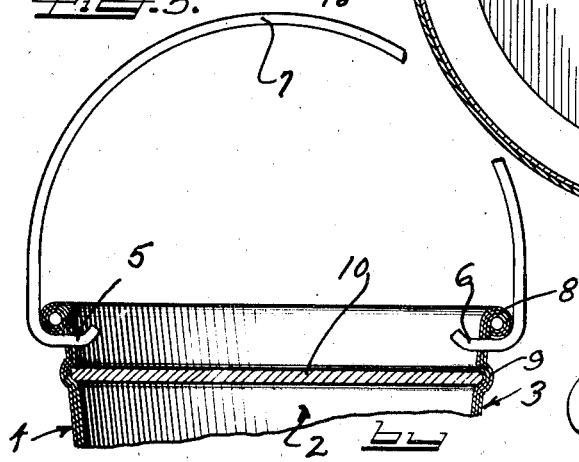
Inventor
CESARE BARBIERI.

Aug. 12, 1941.  C. BARBIERI  2,252,360
CONTAINER AND METHOD OF MAKING SAME
Filed March 9, 1940    5 Sheets-Sheet 2
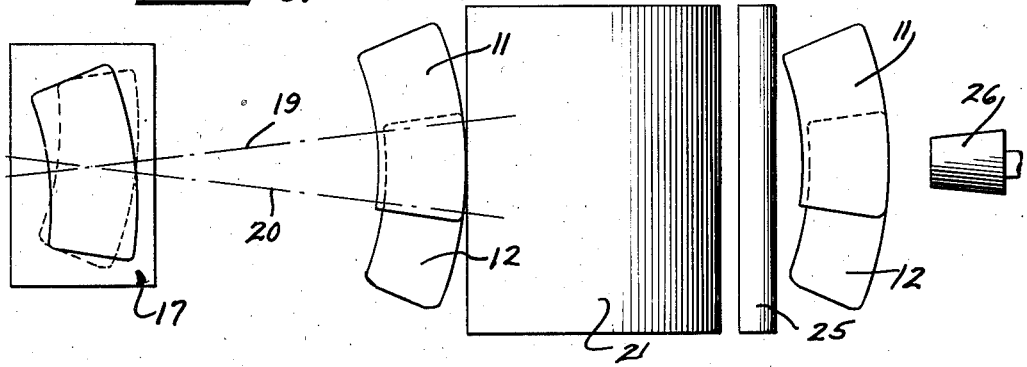
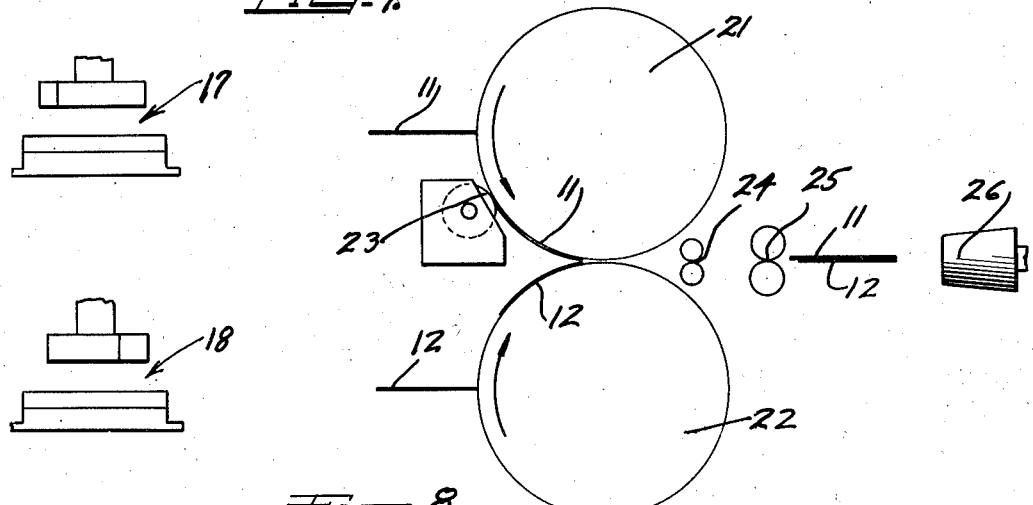
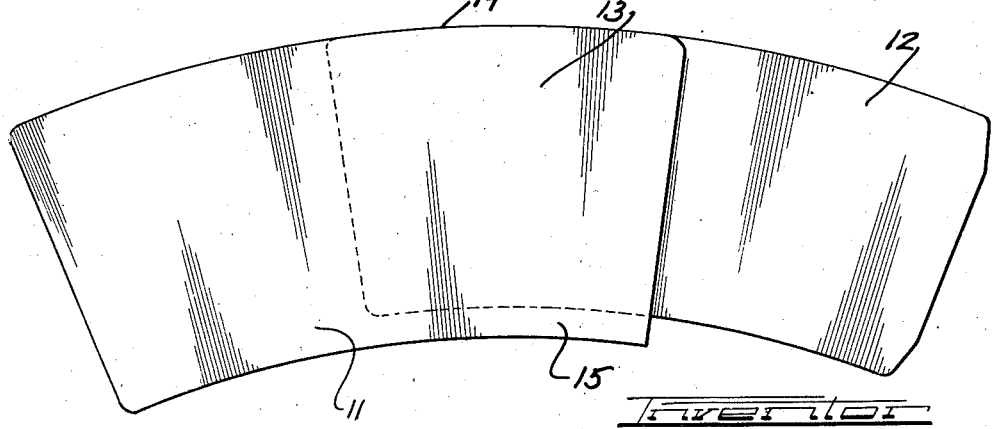

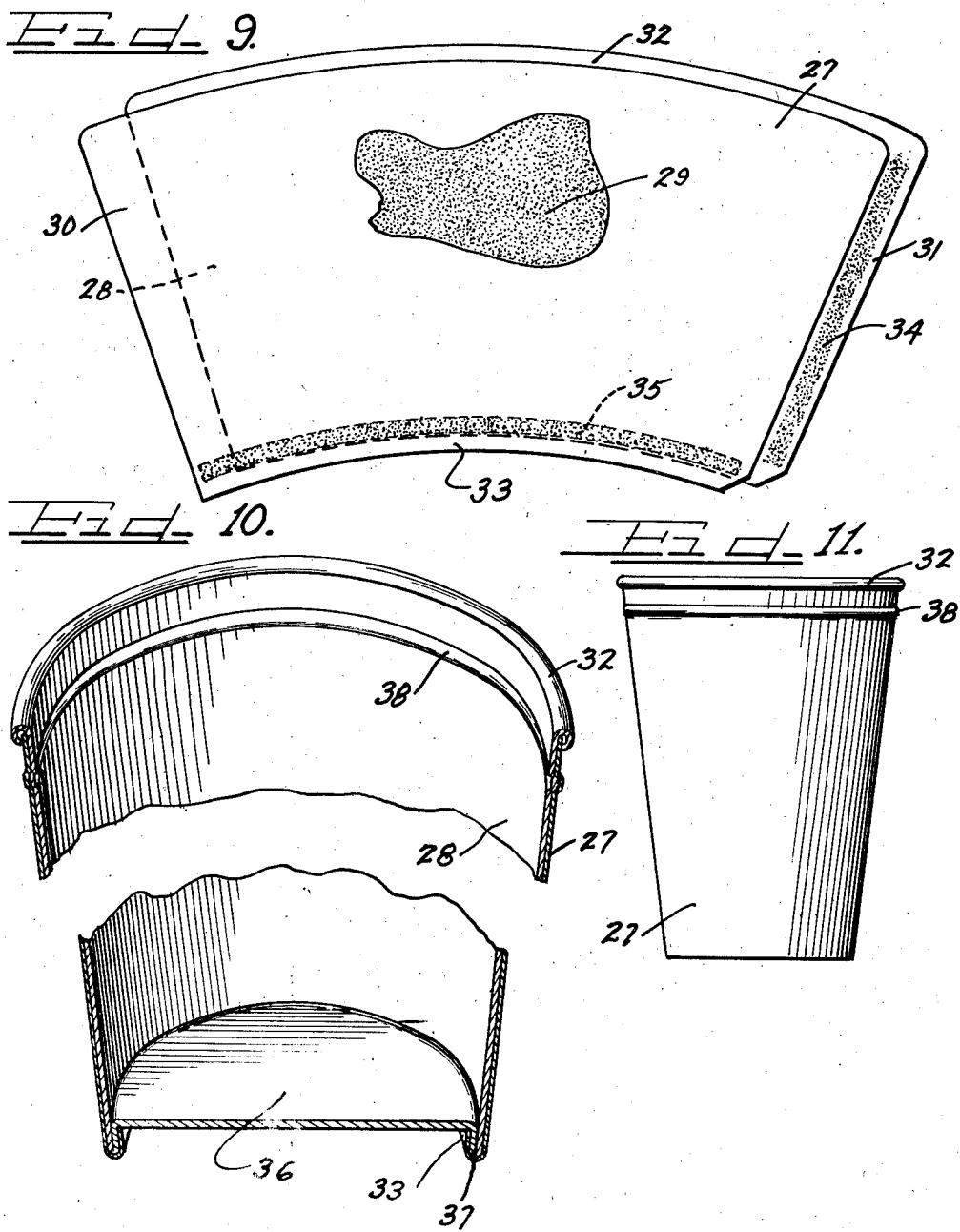

Aug. 12, 1941.  C. BARBIERI  2,252,360
CONTAINER AND METHOD OF MAKING SAME
Filed March 9, 1940   5 Sheets-Sheet 4
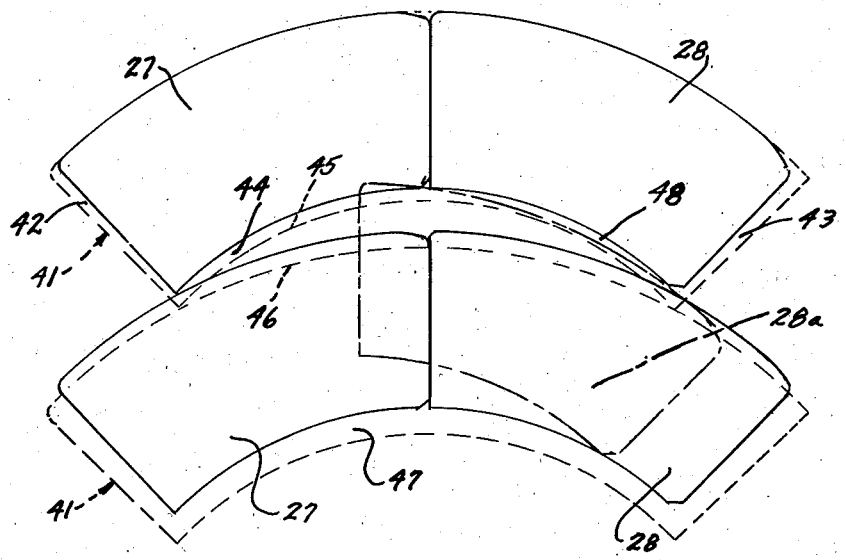
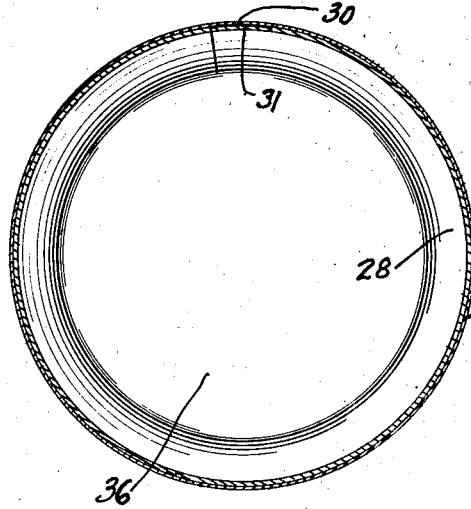
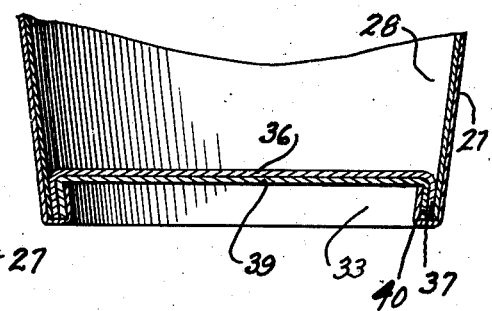
Inventor
CESARE BARBIERI.

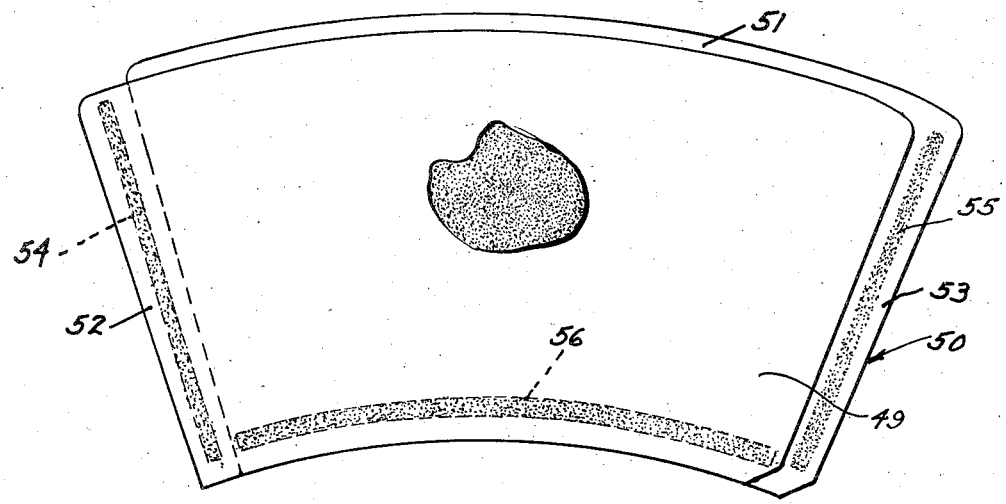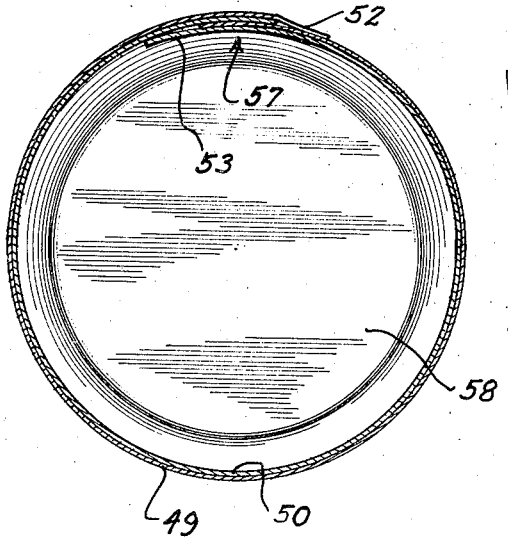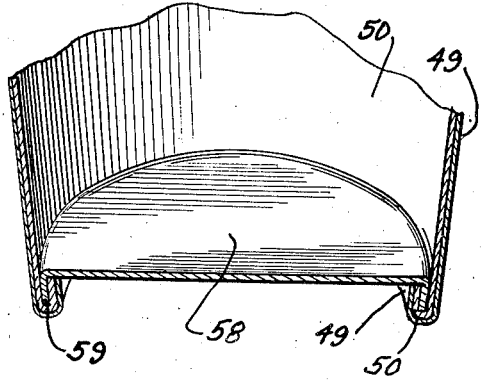

Patented Aug. 12, 1941

2,252,360

UNITED STATES PATENT OFFICE 2,252,360

CONTAINER AND METHOD OF MAKING SAME

Cesare Barbieri, New York, N. Y., assignor to Dixie-Vortex Company, Chicago, Ill., a corporation of Delaware Application March 9, 1940, Serial No. 323,055

7 Claims. (Cl. 93—39.1)

This invention relates to improvements in containers and a method of making the same, the containers being of the general character of flat bottom paper drinking cups and may be manufactured on known paper drinking cup machines, the invention being highly desirable for use in connection with the serving or carrying of hot liquids, very cold substances such as ice cream or the equivalent, or other substances, and capable of carrying such substances for a considerable length of time without any material weakening of the container, although the invention will have other uses and purposes as will be apparent to one skilled in the art.

More particularly, the invention relates to a container having a double or multi-thickness wall to materially strengthen the container and enable it to carry hot or cold substances for a considerable time without material weakening of the container and without an objectionable change in temperature of the substance.

I am aware that in the past many and various types of double-walled paper containers have been provided, some of which were made from a single blank of sufficient length to provide several laps in the finished container and others from a plurality of blanks glued or otherwise adhesively secured together. However, none of these containers of which I am aware were capable of being readily manufactured on known machinery for forming single-walled flat bottom containers of the character of paper drinking cups having the shape of a truncated cone.

For example, a double-walled flat bottom paper drinking cup is disclosed in Lawrence W. Luellen Patent No. 1,284,728, dated November 12, 1918, in which a single blank of sufficient length to be wound twice around in the form of a container is utilized. A blank of that nature results in too great a wastage of paper stock in the cutting of the blank, and it is too difficult to rapidly handle such a blank in a cup-forming machine, owing to the undue length of the blank and the high degree of accuracy with which it must be fed to the machine in order to provide a cup with the edges of both laps in proper register.

With the foregoing in mind, it is an important object of the present invention to provide a container in the nature of a truncated conical paper drinking cup, having a multi-thickness wall and which may be readily manufactured upon known cup-forming machines for forming a similarly shaped container with but a single-thickness wall.

Another object of the invention is the provision of a multi-walled container made from a composite blank consisting of a plurality of initially separate blanks each of which may be cut with a minimum loss of stock, which blanks are secured together in a manner to be handled as a single composite blank in the forming of the container.

A further object of this invention is to provide a double-walled container made from a composite blank formed of initially separate pieces of material, and shaped so as to provide opposed seams of a greater number of thicknesses than the remainder of the container body.

A further feature of the invention is the provision of a container having a plurality of thicknesses of material in the body portion thereof designed so as to provide additional strength at opposed portions of the container for the accommodation of a bail or other carrying medium.

It is also a feature of the invention to provide a container of the character of a flat-bottomed paper drinking cup having additional wall thickness with which a bail is readily associated.

The invention also contemplates the provision of a multi-thickness container of the general nature of a truncated conical paper drinking cup having a bail associated therewith in such a manner that the bail will not come in contact with the contents of the container, and no additional structure need be provided on the container for the accommodation of the bail.

Still another object of this invention is the provision of a paper container having a multi-thickness wall and made from a composite blank of initially separate pieces of stock, wherein the several wall thicknesses may be of different materials, different colors, and certain of which may be printed or not, as desired, with the composite blank so formed being treated as a single blank in the formation of the container.

Another object of this invention is the provision of a composite container blank designed for the formation of a double-walled container, and made up of a pair of initially separate pieces of stock each of which is less than half the size which would be required for a single blank to form the same container, thereby affording a marked saving of material and providing a blank which may be extremely easily handled.

A further object of the invention resides in the provision of new and novel methods of making the various modifications of containers described in this specification.

While some of the more salient features, characteristics and advantages of the present invention have been above pointed out, others will become apparent from the following disclosures, taken in conjunction with the accompanying drawings, in which:

Figure 1 is a top plan view of a container made in accordance with principles of this invention;

Figure 2 is a side elevational view of the container of Figure 1;

Figure 3 is a central vertical sectional view of the container, taken substantially as indicated by the line III—III of Figure 2;

Figure 4 is an enlarged top plan sectional view of the container;

Figure 5 is an enlarged fragmentary vertical sectional view taken on the line III—III of Figure 2, and showing the container equipped with a carrying bail;

Figure 6 is a diagrammatic view in plan illustrating steps in the method of making the container;

Figure 7 is a fragmentary diagrammatic view in elevation illustrating the same steps in the method of making the container;

Figure 8 is a plan view of the composite blank for forming the body portion of the container seen in Figures 1 to 5, inclusive;

Figure 9 is a plan view of a modified form of composite blank, with parts broken away, and in which both initially separate pieces are of substantially identical size;

Figure 10 is a fragmentary vertical sectional view of a container of which the body portion is formed of the composite blank seen in Figure 9;

Figure 11 is a side elevational view of the container of Figure 10;

Figure 12 is a diagrammatic view to illustrate approximately the saving in material resulting from the use of the composite blank of Figure 9 over the use of one elongated single-piece blank for forming a container of like size;

Figure 13 is a plan sectional view of a buttseamed container which may be made from the composite blank of Figure 9;

Figure 14 is a fragmentary vertical sectional view illustrating the use of a double bottom in the container;

Figure 15 is a plan view, with parts broken away, of still another form of composite container blank;

Figure 16 is a plan sectional view of a container made from the blank of Figure 15; and Figure 17 is a fragmentary vertical sectional view of the container of Figure 16.

As shown on the drawings:

In the illustrated embodiment of this invention seen in Figures 1 to 8, inclusive, there is shown a flat bottom cup or container comprising a bottom member 1 and a double-walled body portion generally indicated by numeral 2. When the container is formed, the composite blank making up the container is so arranged as to provide triple-ply seams 3 and 4 preferably diametrically opposed in the finished containers. These seams obviously give materially added strength and rigidity to the container as a whole and provide adequate anchorage for the ends 5 and 6 of a bail 7, as seen in Figure 5. At the mouth end thereof, the container is provided with a downwardly turned or rolled rim bead 8 which not only provides a smooth drinking or pouring rim but also adds to the general strength and stability of the container. A suitable distance below the rim bead 8, the container is internally grooved to provide an outwardly extending hollow bead 9. The groove formed in the provision of this bead functions as a seat for a suitable disk cap or closure 10 which may be inserted, if desired, to protect the contents of the container.

Between the annular bead 9 and the rolled rim 8, the container wall may be provided with a pair of apertures for the accommodation of the bail ends 5 and 6, as seen in Figure 5, these apertures preferably being located in the triple-ply side seams 3 and 4 so as to provide a reinforced anchorage for the bail. In applying the bail to the container, which may be done after the container has been filled, if so desired, it is simply necessary to spring the ends 5 and 6 into position, where they will remain due to the inherent tendency of the bail to contract. It will be noted that still further support for the bail is given by the rolled rim 8, and it also should be noted that the inner ends 5 and 6 of the bail extend inwardly in position over the cap 10 so as to prevent accidental dislodgment of the cap. When it is desired to remove the contents of the container, it is a simple expedient to remove the bail wire by withdrawing the ends 5 and 6 from the container body, and then the cap may be readily taken out.

With this arrangement, it will be appreciated that the cups or containers may be made and assembled in stacked relationship, and so delivered to the retail dealer or user. The bails may be provided in a separate package. Thus, much less space is occupied than would be the case if the cups were delivered to the user with the bails already attached. Consequently, it is a simple expedient for the user to remove a cup or container from a handy dispenser, fill the container with the desired contents, insert the cap 10, and if a bail is desired, attach it to the container. If no bail is desired, then no bail is wasted.

The cup or container seen in Figures 1 to 5, inclusive, is made from a composite blank illustrated in Figure 8. This composite blank includes an outer blank or piece of stock 11 and an inner blank or piece of stock 12, both initially separate and joined so that they overlap for substantially half their lengths, as indicated at 13. The initial blanks 11 and 12 are of substantially similar shape and each comprises an arcuate piece having a curved edge at one end to form a portion of the mouth of the finished receptacle, a curved edge at the other end for association with the bottom 1, and a pair of converging straight side edges. The blanks are arranged so that the curved mouth-defining edges coincide to provide a complete edge 14 which extends twice around the mouth of the container and from which the rim bead 8 is formed. The outer blank 11 extends below the inner blank 12, as indicated at 15, a suitable distance to be turned inwardly around a depending flange 16 on the bottom 1, as clearly seen in Figure 3. It will be seen that with the blanks overlapped to substantially half the length of each blank, the composite blank will form a double-walled container when wound one and one-half times around, and thus provide a tripleply seam at two opposite points in the resultant container.

This composite blank and the ultimate cup may be made under a novel method, as indicated by the diagrammatic showing in Figures 6 and 7. It is to be appreciated that the showing in Figures 6 and 7 is not an attempt to illustrate a machine or mechanism for making the cup after the formation of the composite blank, but is merely diagrammatic illustration of location of structures that might be used in practicing the method.

With reference to Figures 6 and 7, a pair of spaced blank cutting devices, generally indicated by numerals 17 and 18, are provided, each of which is designed to sever one portion of the composite blank. In this instance, the device 17 cuts the outer blank 11 and the device 18 cuts the inner blank 12. The initial blanks are then fed forwardly from their respective cutting devices, the upper blank 11 being fed along a path indicated by the line 19 in Figure 6, and the inner blank 12 being fed along a path indicated by the line 20. It will be noted that the paths 19 and 20 are at an angle to each other, this angle depending upon the desired width of overlap between the two blanks in forming the composite blank. By feeding the two separate pieces along paths at an angle to each other, the two pieces are brought into vertical alignment in keeping with their ultimate relative disposition so that the curved mouth-defining edge portion of each of the separate blanks will coincide to provide the edge 14. The blank 11 is fed by any suitable means to a gripping roll 21 equipped with any suitable mechanism for engaging the blank. Likewise, the blank 12 is fed to a gripping roll 22 and similarly engaged and carried around with the roll in the direction indicated by the arrows in Figure 7. During its travel for substantially a quarter revolution with the roll 21, the blank 11 is brought into contact with a suitable glue supply, such as the roll 23, and adhesive is applied to the surface of the blank. This adhesive may be applied over the area of overlap of the two blanks or, if so desired, it may be applied over the total inside face of the outer blank 11 so that when the two blanks are ultimately wound into container shape, that portion of the outer blank beyond the overlap will also be adhesively secured to the inner blank. The rolls 21 and 22 are in superposed relationship so as to bring the two blanks 11 and 12 together between the rolls and press them to establish a bond between them by virtue of the adhesive. The composite blank, leaving the rolls 21 and 22, may then pass between a pair of presser rolls 24 and another pair of presser or feeding rolls 25, from which the composite blank is delivered by any suitable means to a forming mechanism which may be in the nature of a mandrel 26 forming a part of the container making machine, where the composite blank is formed into the container seen in Figures 1 to 5, inclusive.

It will be appreciated that by the practice of this method, there is a relatively continuous movement of the blank from the time it is severed from a sheet or ribbon of stock by the blank cutting means, during the formation of the composite blank from the two initial blanks, on through until the ultimate finished container is produced. It will be seen that by feeding the two initial blanks along paths at an angle to each other, the assembling of the composite blank is extremely simple and easily perfected.

In Figures 9 to 13, inclusive, I have illustrated a slightly different form of composite blank embodying principles of this invention, and this particular form of blank is one which results in the most saving of material. However, a cup made from the composite blank of Figure 9 is not as well adapted for use with a bail as the container previously described herein. The composite blank of Figure 9 may be made by substantially the same method as above described.

This composite blank includes an outer initially separate piece or blank 27 and an inner initially separate blank 28. Adhesive 29 is used in assembling the two blanks into the composite blank, and this adhesive covers substantially the entire overlapping portions of the pieces 27 and 28. It will be noted that the pieces 27 and 28 are assembled in staggered or echelon arrangement with a margin 30 of the outer blank projecting beyond the inner blank at one end, and a margin 31 of the inner blank projecting beyond the outer blank at the other end. Likewise, a margin 32 of the inner blank projects above the outer blank, this margin ultimately forming the roll at the mouth end of the finished cup, and the margin 33 of the outer blank projects below the inner blank, this margin being ultimately turned up over the flange of the bottom member of the container. It will be further noted that both blanks or pieces 27 and 28 are of substantially identical size and shape. After the composite blank has been assembled, a vertical stripe of adhesive 34 may be applied along the protruding margin 31 of the inner blank, and a curvate stripe of adhesive 35 applied just above the protruding margin 33 of the outer blank, as seen in Figure 9.

In forming the composite blank of Figure 9, only one revolution is necessary to make the body of the cup to provide the container seen in Figures 10, 11 and 13. The body blank is, of course, wound around a bottom member 36 having a depending flange 37 which is united to the composite body blank by the adhesive stripe 35, the protruding marginal portion 33 of the outer blank being turned inwardly around this bottom flange and around the lower edge of the inner blank. When the cup is formed, an inside groove 38 is provided as above described for the accommodation of a cap member, if so desired. As stated above, the protruding margin 32 of the inner blank is turned outwardly and downwardly over the upper edge of the outer blank to provide a curled rim bead, as seen in Figures 10 and 11.

In order to effect the greatest saving of material, the side seam formed along the body portion may be in the nature of a butt-joint, as seen in Figure 13, with the end or side edges of each blank abutting each other and the protruding margin 30 of the outer blank overlying the protruding margin 31 of the inner blank, which margins are held together by the adhesive stripe 34. It will be noted that the seam thus established is a smooth butt-seam and does not increase the thickness of the double-ply cup wall, but on the other hand leaves a flush contour both inside and outside of the container. If so desired, the seam between the margins 30 and 31 might be of the overlapped type, giving an added thickness in the seam, and in that event it would be necessary to make each of the originally separate blanks 27 and 28 somewhat longer to accommodate the overlapped type of seam and still provide a cup of the same size.

It will be further noted, as seen in Figures 10, 11 and 13, that with any of the composite blanks illustrated in the drawings, one originally separate blank need not be of the same material as the other originally separate blank. For example, in these figures, the outer blank 27 is shown as being of thinner material than the inner blank 28. Obviously, either blank may be of a different color than the other, printing may be provided on one of them, and such variations in construction as may be desired for a particular usage, thus supplied. Likewise, if it is desired to have an outside bottom member matching in color or other decoration with the body of the container, a second bottom member 39, also having a depending flange 40, may be used, as illustrated in Figure 14. To accommodate this second bottom member, depending upon its thickness, it might be necessary to allow a little more protruding margin 33 on the outer blank 27 than is shown in Figures 9 and 10 for a single bottom member. It might also be desirable to adhesively attach the bottom members to each other or put a stripe of adhesive on the inside of the marginal portion 33 for attachment to the second bottom member.

In Figure 12, I have indicated diagrammatically a rough comparison between the cutting of the blanks 27 and 28 and the cutting of a single blank which might be doubly wound to form a container with a double-ply wall, to indicate to a reasonable extent the saving of material resulting from the use of the two blanks 27 and 28 put together to form a composite blank for the container body. In this figure, I have represented the blanks 27 and 28 as disposed end to end or side by side, which is a position that would quite likely not be the position of the blanks when cut from a stock sheet or strip. The blanks are illustrated in this position however, against a dotted-lined blank 41 of the proper size to form a similar container body in the event a one-piece blank is used.

It will therefore be noted that there is a space 42 and 43 at the ends of the blanks 27 and 28 respectively which designates a saving in paper. Because of the ultimate disposition of the blanks 27 and 28 when they are assembled into a composite blank, that much paper stock is saved. In other words, the blank 27 may be less in size than half the single blank 41 to the extent of the space 42, and the blank 28 may be less in size than half the blank 41 to the extent of the space 43. Likewise, because of the staggered relationship of the blanks 27 and 28 when assembled, there is an added saving equivalent to the space or marginal portion 44 all along the lower edge of the supposed single-piece blank 41.

In cutting single-piece blanks for forming a double-walled container in successive order from a stock sheet or strip, the cuts would be made as close together as possible, in order to save stock. With reference to Figure 12, it will be seen that the successive blanks 41—41 cannot be cut any closer together than indicated by the dotted lines 45 and 46 respectively. The portion of stock between or embraced by the two lines 45 and 46 is necessarily wasted. In order to illustrate the multiplication of the saving of stock of two adjacent blanks 27 and 28 by virtue of the saving of the strip 44, I have illustrated how closely together the blanks 27 and 28 may be cut from a strip of stock superimposed on the cutting of the blanks 41—41, and it will be noted that the upper edges of the lower blanks 27 and 28 are well within the waste area between the dotted lines 45 and 46. It should also be noted that the marginal portion of the lowermost blank 41, designated at 47, which is a saving of material, is substantially twice the size of the marginal portion 44, and the saving at the ends of the blanks 27 and 28 has doubled. With the cutting of the next blank, the saving area would be triple that shown, and so on until after a number of blanks 27 and 28 have been cut there would be quite a piece of material left from which many more blanks could be cut, thus affording a distinct saving over the cutting of single-piece blanks such as the dotted lined blank 41.

However, the two blanks 27 and 28 are preferably not cut in the position shown in Figure 12, but the better practice, resulting in an even greater saving of material, would be to cut these blanks in the manner indicated by the blank 28 and the disposition of the dot-dashed line 28a. The blanks 27 may be cut from another strip or sheet of stock, if there is any difference in size between the blanks 27 and 28, as will be later described in connection with Figure 15, but in view of the fact that the blanks 27 and 28 are of the same size and shape all of the blanks may be cut from the same strip if they are pre-cut and assembled for any reason or be cut in similar manner from several strips and fed at a slight angle to each other if the cup is manufactured under the method explained in connection with Figures 6 and 7.

With blanks of such relatively small size as the blanks 27 or 28, the only waste between adjacent blanks would be that very small area designated 48 between the lower edge of the blank 28 and the upper edge of the dot-dashed line 28a, which saving is clearly distinguishable over that between the dotted lines 45 and 46, but which when magnified by the production of hundreds of thousands of blanks is in reality an immense saving in material, and, in addition, there is much less wastage between the end of a blank and the top of the next blank.

It will be understood, of course, that all of the pieces going to form all of the composite blanks illustrated in the drawings and described in this specification result in a great saving of material over the use of a single blank long enough to be wound twice around to form a double-walled container, the composite blank shown in Figure 9 resulting in the greater saving because of the fact that both pieces forming this blank are of the same size.

In Figures 15, 16 and 17, I have illustrated another composite blank and the cup or container made therefrom, to illustrate that the present invention is also capable of producing a blank having a double-thickness side wall fold over the bottom flange, in case added rigidity is required in the container in this region.

In this instance, the composite blank is made up of an outer blank 49 and an inner blank 50, both of which are of substantially the same length, and this length is equal to substantially half the length of a single-piece blank of the character of the blank 41 described above. The inner blank 50, however, is wider than the outer blank 49 to the extent of the area designated 51 which will ultimately be turned down over the upper edge of the blank 49 in the nature of a rim roll. Both blanks coincide at their bottom edges, except where a marginal portion 52 of the outer blank protrudes beyond the inner blank, and where a marginal portion 53 of the inner blank protrudes beyond the outer blank. In this instance, the blank is wound with a quadruple-thickness overlap seam, by way of example, and to this end a stripe of adhesive 54 is applied to the inner face of the margin 52 of the outer blank, and a similar stripe of adhesive 55 is applied to the outer face of the margin 53 of the inner blank. The curvate stripe of adhesive 56 may be applied to the inner face of the inner blank near the bottom thereof for engagement with the depending flange of a bottom member.

When the blank is formed into container shape by substantially a single turn of the composite blank, a quadruple-thickness overlap seam 57 may be provided, as indicated in Figure 16. The adhesive stripe 55 on the inner blank adheres to a portion of the inner blank, and the adhesive stripe 54 on the margin 52 of the outer blank adheres to a portion of the outer blank, both beyond the seam proper. Of course, the body portion of the blank is assembled together with a bottom member 58 having a depending flange 59, the adhesive stripe 56 adhering to this flange, and then the lower marginal portion of both pieces 49 and 50 are turned around the flange 59, as seen in Figure 17. The composite blank of Figure 15 may be formed into the container of Figures 16 and 17 by the practice of the method described in connection with Figures 6 and 7.

It will, of course, be appreciated that any of the containers illustrated in this application may be provided with a multi-ply rim bead at the mouth of the container or a multi-ply engagement with the depending flange on the bottom member, or may be used with a double-thickness bottom, as may be desired, by a simple alteration in the shape of one of the pieces going to make up the composite blank.

From the foregoing, it is apparent that I have provided a novel container having a multi-ply wall which is exceedingly simple in construction and highly rigid, durable and stable. It will be appreciated that the invention adapts itself for a selective use with a bail which not only may be readily attached to the container but also when attached does not come in contact with the contents of the container and actually aids in maintaining a cover in position over the contents. It will further be appreciated that the invention may be practiced by a new and novel method of manufacture which results in a great saving of material.

It will, of course, be understood that numerous details of construction may be varied through a wide range without departing from the principles of this invention, and it is, therefore, not the purpose to limit the patent granted hereon otherwise than is necessitated by the scope of the appended claims.

I claim as my invention:

1. The method of making a container, including the steps of cutting a plurality of arcuate blanks, then feeding each blank along a separate line of travel at an angle to another line of travel to an assembly location, joining the blanks in overlapped staggered relationship to form a composite blank, and forming a container from said composite blank.

2. The method of making a container, including the steps of cutting a plurality of arcuate blanks, then feeding each blank along a separate line of travel at an angle to another line of travel to an assembly location, joining the blanks in overlapped staggered relationship to form a composite blank, and forming a container having a multi-ply wall from said composite blank by turning the composite blank into tubular form in less than two revolutions.

3. The method of making a container having a tapering double-ply wall, including the steps of cutting a pair of curvate blanks, feeding the blanks along separate paths at an angle to each other to an assembling location, securing the blanks together in overlapped relationship, and forming a container from the composite blank thus made about a bottom closure.

4. The method of making a flat-bottom container having a tapering double-ply wall, including the steps of cutting a pair of similarly shaped curvate blanks, joining the blanks together in such manner that a margin of one projects below the other to form a composite blank, shaping the composite blank into a container body about a flanged bottom blank, and turning said projecting margin around the flange of the bottom blank.

5. The method of making a flat-bottom container having a tapering double-ply wall, including the steps of cutting a pair of similarly shaped curvate blanks, forming a composite blank by securing the initially separate blanks together in such manner that a margin of the inner blank projects above the outer blank, shaping the composite blank into a container body about a bottom member, and curling down the projecting margin of the inner blank over the edge of the outer blank to provide a rolled rim bead at the mouth of the container.

6. The method of making a flat-bottom container having a double-ply tapering wall, including the steps of cutting a pair of similar curvate blank pieces, forming a composite blank by securing the curvate pieces together in echelon arrangement with a bottom margin and an end margin of the outer piece extending beyond the inner piece and the top margin and opposite end margin of the inner piece extending beyond the outer piece, forming the composite blank into a container body about a flanged bottom member with the projecting end margins forming a butt-seam of the same thickness as the rest of the body wall, turning the bottom projecting margin around the lower edge of the inner piece and the flange on the bottom member, and curling the top projecting margin downwardly over the edge of the outer piece to provide a rim bead at the mouth of the container.

7. The method of making a flat-bottom container having a tapering double-ply wall, including the steps of cutting a pair of curvate blank pieces, feeding said pieces along separate paths at an angle to each other to an assembly location, joining the pieces into a composite blank with one piece overlapping the other substantially half its length, and wrapping the composite blank approximately one and one-half turns into a container body about a bottom member, and providing overlapping seams in said body at substantially opposite points and of greater ply thickness than the remainder of the body wall.

CESARE BARBIERI.